Nov. 2, 1965  W. F. HASTINGS ETAL  3,215,249
GLASS WORKING CONVEYING APPARATUS
Original Filed June 3, 1959  4 Sheets-Sheet 1
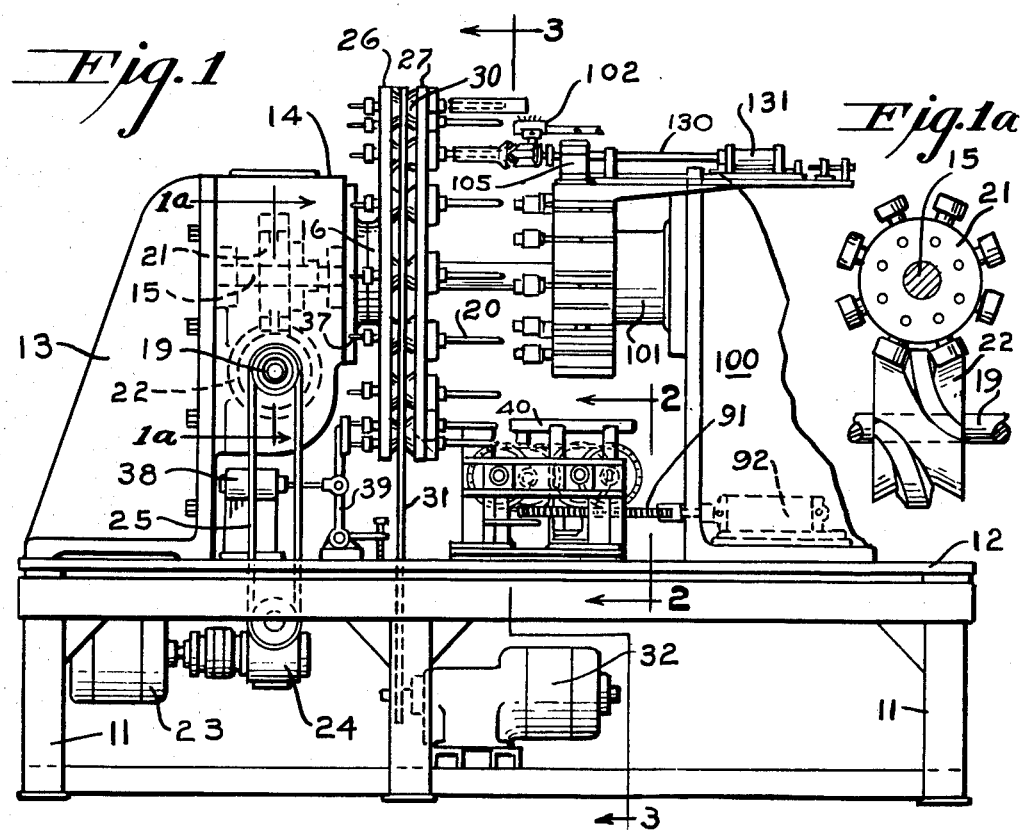
Fig. 1
Fig. 1a
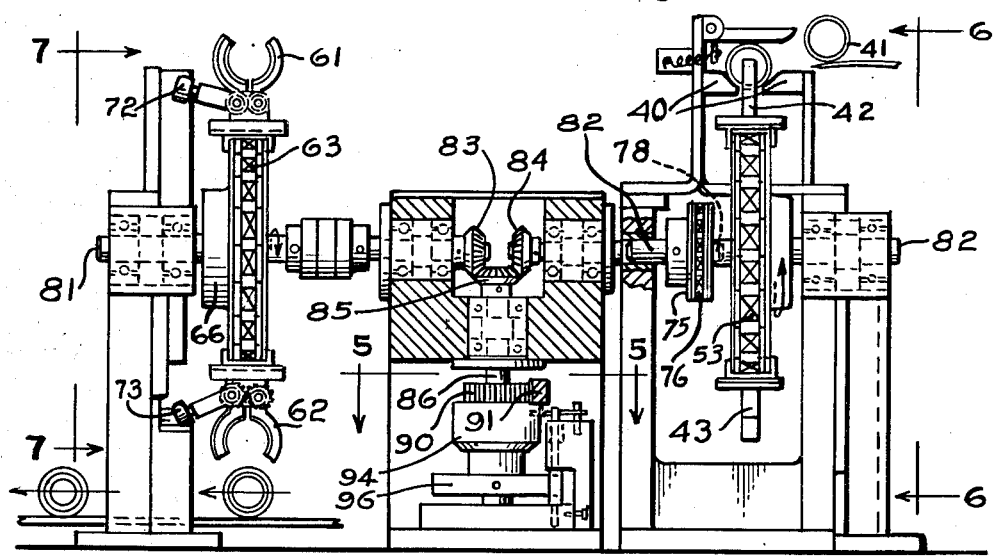
Fig. 2
INVENTORS
WALTER F. HASTINGS
AND MOREY L. LAMPSON
BY Clarence R. Patty J.
ATTORNEY

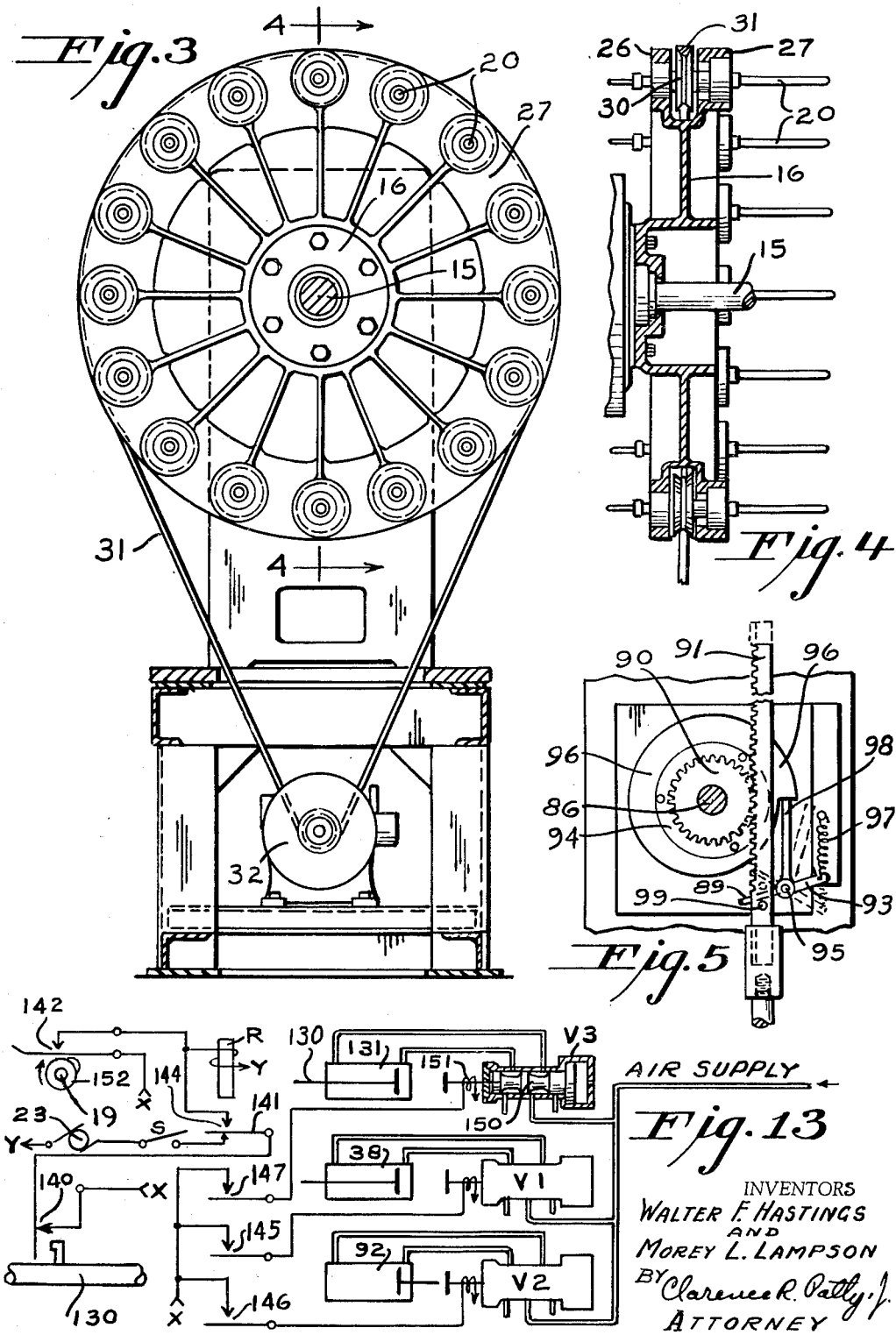

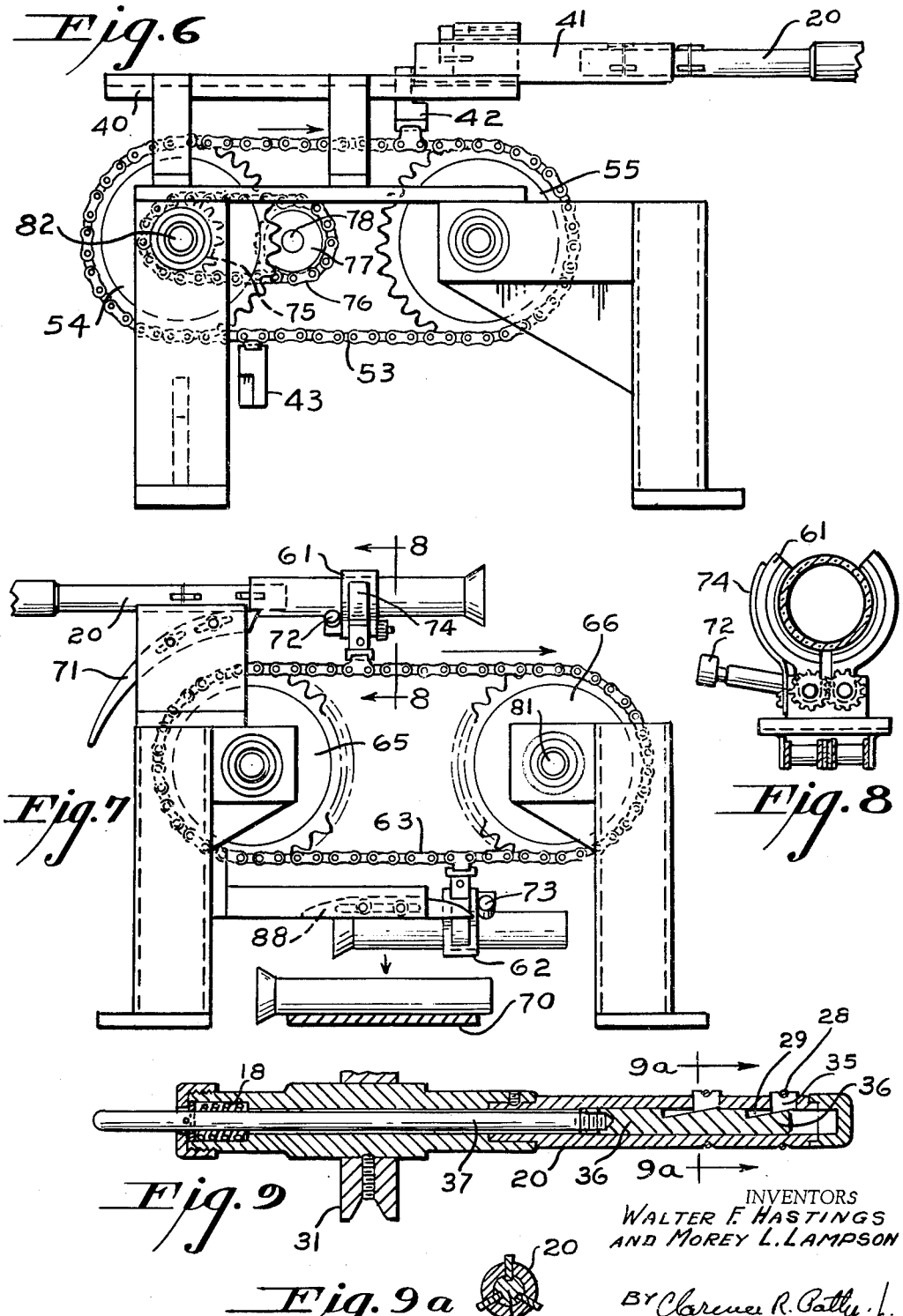

INVENTORS
WALTER F. HASTINGS
AND MOREY L. LAMPSON

BY Clarence R. Patty Jr.
ATTORNEY

United States Patent Office 3,215,249
Patented Nov. 2, 1965

3,215,249
GLASS WORKING CONVEYING APPARATUS
Walter F. Hastings, Painted Post, and Morey L. Lampson, Corning, N.Y., assignors to Corning Glass Works, Corning, N.Y., a corporation of New York
Continuation of application Ser. No. 149,148, Oct. 27, 1961, which is a continuation of application Ser. No. 817,946, June 3, 1959. This application Apr. 6, 1964, Ser. No. 358,154
7 Claims. (Cl. 198—22)

The present invention is a continuation of application Serial No. 149,148, now abandoned, filed October 27, 1961, which is in turn a continuation of application Serial No. 817,946, filed June 3, 1959, and now abandoned. The application relates to a glass working machine adapted to have fed thereto workpieces comprising lengths of glass tubing which are then heated at one end, flared and discharged therefrom and to an improved apparatus for effecting the loading and unloading of such machine.

According to the invention the workpieces are fed to a loading position at which they are successively pushed onto mandrels, arranged in a row about the peripheral region of a turret adapted to be turned in step-by-step fashion to successively index the mandrels at different positions along their path of travel. As the turret is being turned the free ends of the mandrel supported workpieces are fed through flames projected from a series of burners located at positions along their path; and at a position at which the mandrels are indexed along such path a flaring tool is arranged to engage and suitably flare the flame softened end of a workpiece. Also, according to the invention, a mechanism having a common drive with that employed to feed a workpiece onto a mandrel, is concurrently employed to unload a flared workpiece from another of such mandrels and to eject the same at a delivery position.

For a full understanding of the invention, a preferred form of apparatus embodying the same has been illustrated in the accompanying drawings.

Figure 10:
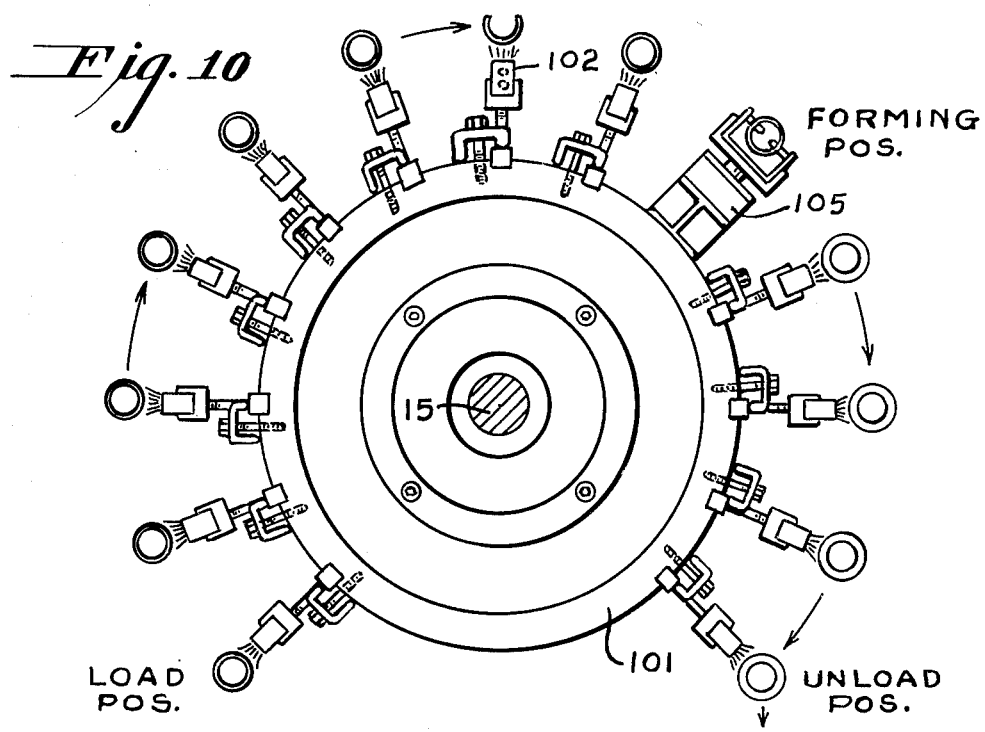
Figure 11:
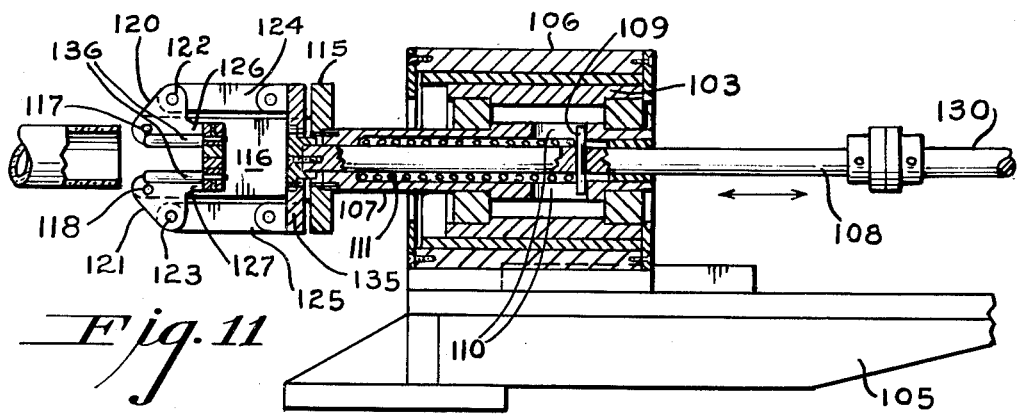
Figure 12:
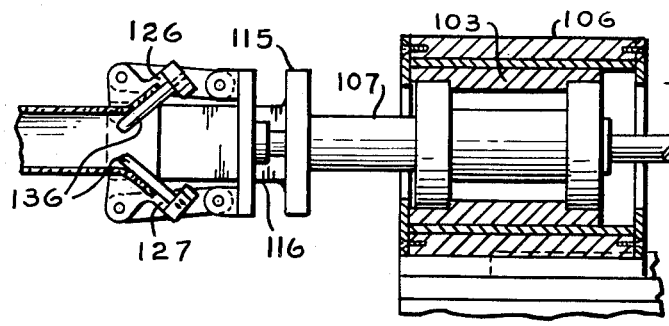

FIG. 1 is a side elevational view of such apparatus.
FIG. 1a is an enlarged view of a fragment of such apparatus.
FIG. 2 is an enlarged view taken on line 2—2 of FIG. 1.
FIG. 3 is an enlarged view taken on line 3—3 of FIG. 1.
FIG. 4 is a view taken on line 4—4 of FIG. 3.
FIG. 5 is a view, on an enlarged scale, taken on line 5—5 of FIG. 2.
FIGS. 6 and 7 are views taken on lines 6—6 and 7—7 respectively of FIG. 2.
FIG. 8 is an enlarged view taken on line 8—8 of FIG. 7.
FIG. 9 is an enlarged view, in section, of one of the mandrels employed, illustrating chuck jaws embodied therein and their associated operating cams.
FIG. 9a is a sectional view taken on line 9a—9a of FIG. 9.
FIG. 10 is a view taken generally along line 3—3 of FIG. 1, but located to the right of such line.
FIG. 11 is an enlarged view of a fragment of the tube flaring unit assembly supporting bracket and a sectional view of the flaring unit assembly adjacent the end of a tube about to be flared.
FIG. 12 is a further view, similar to FIG. 11, illustrating the flaring apparatus in flaring association with a tube.
FIG. 13 is a wiring and piping diagram of the apparatus.

Referring to FIG. 1 of the drawings, the numeral 11 designates a main machine frame or support having a top 12. Arranged on top 12 is a bracket 13 to which is secured a housing 14 having suitable bearings supporting a shaft 15 upon which is carried, in a region outside the housing, a turret 16. Shaft 15 is adapted to be turned in step-by-step fashion through the medium of a driven member 21 (FIG. 1a) keyed thereto, to which turning torque is intermittently applied by a screw 22 carried on a shaft 19 and in turn driven by a suitable motor 23 through the medium of a gear reduction unit 24 and a belt 25.

The turret 16 embodies two circular rims 26 and 27 arranged in laterally spaced relation. A circular row of mandrels such as 20, pass transversly through aligned passages in such rims. Pulleys such as 30 are arrranged on the respective mandrels in the space between the rims 26 anl 27 and have a belt 31 trained thereabout and about a pulley carried by a motor 32 for rotating the respective mandrels about their own axes during a portion of their path of travel with turret 16.

Each mandrel such as 20 is tubular and has side openings through which jaws such as 35 (FIG. 9) are seated on cam surfaces such as 29 on a rod 36. Split rings such as ring 28 retain the jaws in place, but permit movement of rod 36 under the influence of a spring such as 18 to force the jaws into frictional engagement with the bore wall surface of a workpiece arranged on the mandrel.

Each cam surfaced rod such as 36 (FIG. 9) is fixed to a push rod such as 37 projected leftward from plate 26 (FIG. 1). Two rods such as 37 are adapted to be operated simultaneously following their arrival at mandrel loading and unloading positions respectively along their path of travel, by a fluid cylinder 38 and a push lever 39 operable thereby.

As illustrated in FIGS. 1, 2, and 6, opposite the free end of a mandrel at the loading position, are laterally spaced supports such as 40 for workpieces comprising tubular bodies such as 41 which may be delivered in bridge thereof in any convenient fashion, such supports forming a workpiece supporting trough provided with a slot in the bottom thereof. Transfer of a tubular body such as 41 to a mandrel arranged at the loading position is effected by one of two pusher devices 42 or 43, FIGS. 2 and 6, carried by a chain 53, trained about sprocket wheels 54 and 55.

To provide for the unloading of a tube from a mandrel, chuck 61 and 62 (FIGS. 2, 7 and 8) carried by a chain 63 are provided. Chain 63 is trained about sprocket wheels 65 and 66. The spacing and positioning of chucks 61 and 62 are such that one of them is positioned to remove a tube from a mandrel at the unloading position while the other is inverted at a delivery position, preferably over a suitable receiving conveyor such as 70, FIG. 7. A cam 71 is cooperative with arms 72 and 73 of the chucks 61 and 62 to open them against the tension of their closing springs such as 74 to enable encirclement of a tube by the chuck. A second cam 88 is engaged by arms 72 and 73 to open the chucks to release the tubes therefrom as they become positioned over conveyor 70.

The chains 53 and 63 are driven by their associated sprocket wheels 54 and 66, respectively, which are keyed to their respective drive shafts 82 and 81. Shaft 82 carries a sprocket wheel 75 (FIGS. 2 and 6) about which a drive chain 76 is trained and driven by a sprocket wheel 77 carried by a countershaft 78 and provided with a bevel gear 84 (FIG. 2) in mesh with a driving bevel pinion 85 carried by a drive shaft 86. Shaft 81 carries a bevel gear 83 also in mesh with the driving pinion 85. The drive of shaft 82 through the medium of countershaft 78 is only necessitated by the fact that, as will be observed from FIG. 1, the loading and unloading assemblies are positioned different distances from the turret 16.

Shaft 86 is driven in step-by-step fashion through the medium of a pinion 90 in mesh with a drive rack 91 operable by a fluid cylinder 92 (FIGS. 1 and 13). The shaft 86 receives its drive from pinion 90 through a one way clutch 94 which is turned with pinion 90 when fluid is being supplied to the end of cylinder 92 from which its piston rod projects (clockwise as shown in FIG. 5).

To guard against any possible overtravel of the shaft 86 after the drive stroke of rack 91 is completed, a single tooth ratchet wheel 96 (FIGS. 2 and 5) keyed to the shaft 86 and a cooperative positive stop lever having a ratchet stopping arm 98 is provided. A pin 99 on rack 91 is so located that, during the final stage of free movement of pinion 90, such pin engages an arm 89 of the lever and moves it clockwise against the tension of a spring 97, clear of the tooth of ratchet wheel 96, as indicated by interrupted lines in FIG. 5. When the reverse or driving movement of rack 91 occurs the ratchet wheel 96 is turned clockwise and passes under lever arm 98 which thereafter engages the ratchet wheel under the influence of spring 97. Just as the drive stroke of rack 91 is completed the end of lever arm 98 is engaged by the ratchet wheel tooth and thus positively prevents overtravel of the shaft 86.

Mounted on a bracket 100 (FIG. 1) is a cylindrical support 101 having burners, such as 102 (FIGS. 1 and 10) spaced about the major portions of its periphery. In a space between two of such burners, a glass tooling or tube flaring apparatus support bracket 105 (FIGS. 1 and 11) is provided. Arranged on bracket 105 is a cylinder 106 having a spool 103 slidable therein and whose hub comprises a tubular shaft 107 forming part of a tube flaring assembly. A shaft 108 passes through the tubular shaft 107 and is coupled thereto through the medium of a pin 109 passing through shaft 108 and projecting into longitudinal slots 110 through the wall of shaft 107. A spring 111 tends to maintain the shaft 108 to the right with pin 109 in engagement with the rightward end of slots 110 and the spool similarly positioned in housing 106. The extreme rightward end of shaft 108 is coupled to the operating shaft 130 (FIGS. 1 and 11) of a fluid operated cylinder 131 adapted to move shafts 107 and 108 and spool 103 leftward.

Secured transversely of the shaft 107, at its leftward end, is a plate 115 from one edge of which a support 116 projects further leftward. Pivoted to support 116, at 117 and 118, are bell cranks 120 and 121 which have arms pivoted at 122 and 123, respectively, to one end of links 124 and 125 and whose other ends are pivoted to a plate 135 attached to the adjacent end of shaft 108, other arms 126 and 127 of the bell cranks support tube flaring tools 136.

The fluid operated cylinders 38, 92 and 131 have operating fluid supplied to one end or the other thereof through like conventional four way valves (FIG. 13) V1, V2, and V3 respectively. As is clear from the showing of valve V3, its spool 150 is pneumatically biased to its leftward position in which it supplies air to the leftward end of cylinder 131 and exhausts the other end of such cylinder to atmosphere. Movement of the spool 150 to the right is provided for by a valve magnet 151 whose circuit is closeable by a relay R. Valves V1 and V2 are, obviously, also similarly controlled by relay R.

The turret drive motor 23, FIGS. 1 and 13, which is of the built-in brake type, is under the joint control of relay R and of contacts 140 operable off the shaft 130 of the fluid cylinder 131. Operation of relay R is over a circuit including contacts 142 momentarily closed by a cam 152 carried on the turret drive screw shaft 19. The operation is as follows:

Assuming that the circuit for the mandrel drive motor 32 has been closed and that the burners such as 102 have been lighted, the attendant closes switch S to start motor 23. The circuit for motor 23 extends from an X terminal of a suitable current source, through relay R, contact spring 141 and its back contact, switch S and through the motor 23 to a Y terminal of the same current source. As the turret 16 completes the reindexing of its mandrels, cam actuated contacts 142 momentarily close to complete the operating circuit of relay R. Relay R picks up and by movement of its contact spring 141 from its back contact to its front contact it interrupts the traced circuit of motor 23, thus causing the turret to come to a stop, and completes a locking circuit for itself including the normally closed contacts 140. At the same time relay R at contacts 145, 146, and 147 closes the respective circuits for the magnets of valves V1, V2, and V3, respectively, to effect movement of their spools, such as 150, to the right hand ends of their cylinders and thus cause air to be supplied to the right hand ends of cylinders 38, 92, and 131 respectively, having reference to FIG. 13. As will be seen from FIG. 1, cylinder 38 moves the lever 39 into association with the push rods of the mandrels at the loading and unloading positions to compress their springs such as 18 (FIG. 9) and thus permit their chuck jaws such as 35 to recede into their mandrels. Cylinder 92 moves the rack 91 in the proper direction to drive chains 53 and 63 as required to position a workpiece on the mandrel at the loading position and to withdraw a workpiece from the mandrel at the unloading position and deliver the same to a region over conveyor 70. As will be evident, at the same time the fluid cylinder 131 is also activated, and as will be seen from FIGS. 11 and 12, will move shaft 108 leftward alone against the action of spring 11 and until the left end of slots 110 are engaged by pin 109. During such movement of shaft 108 the bell cranks 120 and 121 will turn about their pivots 117 and 118 to their operative positions shown in FIG. 12. Subsequently the shaft 107 will be moved leftward along with shaft 108 to the position in which it is also shown in FIG. 12 to engage the flaring tools 136 with the associated workpiece and to flare the same as illustrated.

As the piston rod of the tooling or tube flaring unit completes the necessary movement to complete the workpiece flaring operation, it separates contacts 140, thereby interrupting the locking circuit of relay R whose respective contacts then restore to their shown positions. The spools of valves V1, V2, and V3 accordingly restore to effect the restoration of shafts of the respective fluid operating cylinders 38, 92 and 131 to their original shown positions. Relay R upon restoring re-establishes the operating circuit of motor 23 to again turn the turret to reindex its respective mandrels.

As will be understood the apparatus shown is susceptible of various modifications without departing from the spirit and scope of the invention as claimed. By way of example, tooling of the workpiece, other than flaring, may be carried out simply by substitution of appropriate tools. Also, although in the shown apparatus the reinitiation of the stepping of the turret is effected substantially immediately upon the closure of contacts 140, if desired such contacts may be employed to set a timing device into operation which after a desired time delay reinitiates the stepping action, thus providing added time for effecting the loading, tooling and unloading operations.

We claim:
1. In a tubular workpiece forming apparatus comprising a plurality of horizontally disposed workpiece carrying mandrels which are periodically indexed to each of the succession of positions including a mandrel loading position and a mandrel unloading position, the combination comprising, a pair of horizontally disposed tubular workpiece supports at said loading position such supports being laterally spaced apart to form a slot therebetween extending towards the axis of each mandrel indexed at the loading position, a first chain drive disposed below said slot and carrying at least one workpiece pusher adapted to be moved into and through said slot in a direction to axially project a tubular workpiece provided to said supports onto a mandrel indexed at the loading position, a second chain drive at said unloading posi- tion and carrying at least one chuck adapted to grip a tubular workpiece on a mandrel indexed to the unloading position and to be moved in a direction to axially remove such workpiece from the mandrel, and a motor driven mechanism activated following each periodic indexing of said mandrels and including a gearing arrangement adapted to move said chain drives to drive said pusher and chuck in the directions stated.

2. Apparatus in accordance with claim 1 in which said first and second chains carry a plurality of workpiece pushers and workpiece removing chucks respectively.

3. Apparatus in accordance with claim 2 in which said chuck is actuated to release each tubular workpiece onto a conveyor following the removal of such workpiece from a mandrel.

4. In combination with a tubular workpiece forming apparatus comprising a plurality of horizontally disposed workpiece carrying mandrels and indexing means for periodically indexing each of said mandrels to each of a succession of positions including a workpiece loading position, a workpiece supporting trough provided with a slot in the bottom thereof extending toward the axis of each mandrel indexed at the loading position, at least one workpiece pusher extending up through said slot and adapted to be horizontally moved therethrough; and motor means connected to said pusher, and activated by said indexing means, for moving said pusher through said slot toward each mandrel as such mandrel is indexed at the loading position.

5. The combination in accordance with claim 4 and further including a chuck located at a workpiece unloading position and adapted to grip each workpiece indexed on a mandrel to such position; and motor means connected to said chuck, and activated by said indexing means as each mandrel is indexed to said unloading position, for moving said chuck in a direction to remove a workpiece from such mandrel.

6. Apparatus in accordance with claim 5 in which said chuck is actuated to release each tubular workpiece onto a conveyor following the removal of such a workpiece from a mandrel.

7. In a tubular workpiece forming apparatus comprising a plurality of workpiece carrying mandrels and an indexing means for periodically and intermittently moving each of said mandrels to each of a succession of positions including a workpiece loading position and a workpiece unloading position, the combination comprising, a workpiece pusher at said loading position, a workpiece gripping chuck at said unloading position; and motor means controlled by said indexing means for actuating said pusher to project a tubular workpiece onto each mandrel arriving at said loading position and for actuating said chuck to remove the workpiece from each mandrel arriving at said unloading position.

References Cited by the Examiner
UNITED STATES PATENTS

| | | | |
|---|---|---|---|
| 1,643,215 | 9/27 | Koenig | 65—279 |
| 2,166,871 | 7/39 | Luertzing | 65—54 |
| 2,826,289 | 3/58 | McBurney et al. | 65—284 X |
| 2,878,620 | 3/59 | Calehuff et al. | 198—22 |

DONALL H. SYLVESTER, *Primary Examiner.*